United States Patent Office 3,491,068
Patented Jan. 20, 1970

---

3,491,068
NOVEL COPOLYMERS AND THEIR METHOD OF PREPARATION
Norman G. Gaylord, New Providence, N.J., assignor, by mesne assignments, to Borg-Warner Corporation, Chicago, Ill., a corporation of Delaware
No Drawing. Filed June 16, 1967, Ser. No. 646,463
Int. Cl. C08f 17/00
U.S. Cl. 260—78.5                                      20 Claims

ABSTRACT OF THE DISCLOSURE

Novel 1:1 alternating copolymers of maleic anhydride and diolefinic compounds, such as butadiene; said alternating copolymers containing at least 75% cis-1,4-unsaturation. The copolymers are prepared by reacting maleic anhydride with a diolefinic compound in the presence of a free radical generator, such as an organic peroxide or an azo compound, at a temperature at which the free radical generator has a half life of 60 minutes or less. Derivatives of the copolymers and their preparation are also set forth.

---

This application is a continuation-in-part of Ser. No. 514,128 filed Dec. 15, 1965.

This invention relates to novel copolymers of maleic anhydride and diolefinic compounds, and more particularly to novel copolymers of maleic anhydride and certain conjugated dienes. The invention also pertains to a process for preparing such copolymers.

The reaction of maleic anhydride with various olefin monomers in the presence of suitable polymerization catalysts to prepare copolymers is a well known reaction of practical significance. Thus, styrene-maleic anhydride, ethylene-maleic anhydride and vinyl alkyl ether-maleic anhydride copolymers are important items of commerce.

Equally well known and of practical significance is the reaction of maleic anhydride with conjugated dienes to produce Diels-Alder adducts, e.g., tetrahydrophthalic anhydride from maleic anhydride and butadiene, endomethylenetetrahydrophthalic anhydride from maleic anhydride and cyclopentadiene and the corresponding hexachloro derivative from hexachlorocyclopentadiene are widely used as organic intermediates and in polymer syntheses.

M. C. Kloetzel, in discussing the Diels-Alder reaction with maleic anhydride in Organic Reactions, vol. IV, pages 2–59 (1948), indicates that although conjugated dienes readily undergo a reaction with maleic anhydride to produce the adduct, dienes with doubly substituted carbon atoms in the terminal positions of the conjugated system generally tend to produce copolymers. The structure of these copolymers contains pendant double bonds as a result of the 1,2 addition reaction.

The patent literature contains several references to what are referred to as "copolymers of conjugated diolefins with cyclic unsaturated acid anhydrides." Thus, Belgian Patent 617,612 (Chem. Abstracts 58,9247 h (1963)) describes such copolymers prepared by copolymerization at 190° C. of conjugated diolefin polymers with cyclic unsaturated acid anhydrides in the presence of a free radical inhibitor. The products are liquid polymers of molecular weight 700–5000 containing 30–40%, 1,4-diolefins and up to 60% maleic anhydride. The latter is referred to as being "fixed" and the reaction involved is actually the reaction of a liquid unsaturated diene polymer, which no longer contains conjugated unsaturation, with maleic anhydride, commonly known as the "ene" synthesis, analogous to the well known thermal reaction of long chain olefins with the anhydride to produce unsaturated monosubstituted succinic anhydride derivatives.

U.S. Patent 3,081,283 (Mar. 12, 1963) describes butadienemaleic anhydride copolymer coatings which are unsaturated organic peroxide-catalyzed liquid copolymers containing 0.1–5% maleic anhydride and 95–99.9% butadiene. These copolymers are low molecular weight products resulting either from free-radical catalyzed copolymerization of butadiene with a small amount of maleic anhydride or result from the thermal reaction of maleic anhydride with initially formed low molecular weight liquid polybutadiene.

U.S. Patent 2,933,468 (Apr. 19, 1960) describes the reaction of 0.1 to 20 weight percent maleic anhydride with an unsaturated hydrocarbon resin which is either (a) the copolymer of 97% isobutylene and 3% isoprene made by low temperature Friedel-Crafts polymerization, (b) the product of the Friedel-Crafts polymerization of a steam cracked petroleum stream boiling between 20 and 280° C., (c) liquid or solid polybutadiene or (d) copolymers of 75 to 85% butadiene and 15 to 25% styrene prepared by sodium polymerization. The reaction product is considered to have either the cyclobutane structure from 1,2-cycloaddition of isolated unsaturation with maleic anhydride or the cyclohexene structure from Diels-Alder 1,4-cycloaddition of conjugated unsaturation with maleic anhydride.

One object of the present invention is to provide novel copolymers of maleic anhydride and conjugated dienes.

Another object of the present invention is to provide novel copolymers of relatively high molecular weight from maleic anhydride and conjugated dienes which do not contain double substituted terminal carbon atoms.

A further object of the present invention is to provide a process for preparing such novel copolymers from maleic anhydride and certain conjugated dienes.

These and other objects of the present invention will become readily apparent from the ensuing description and illustrative embodiments.

In accordance with the present invention it has now been found that maleic anhydride can readily be copolymerized in a homogeneous phase with various conjugated dienes, which do not contain doubly substituted terminal carbon atoms, in the presence of a high concentration of free radicals generated from a suitable source. The copolymers produced by this method are characterized by either low or relatively high molecular weight and have numerous commercial applications.

The conjugated dienes which are useful for preparing the novel copolymers of this invention comprise compounds having the following structural formula:

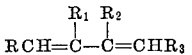

where R, $R_1$, $R_2$ and $R_3$, which may be the same or different, represent a member of the group consisting of hydrogen, halogen, alkoxyl, aryl, cycloalkyl or alkyl radicals having from 1 to 40 carbon atoms, and preferably from about 1 to 8 carbon atoms. Illustrative conjugated dienes include butadiene, isoprene, 2-chloro-1,3-butadiene, 2,3-dichlorobutadiene, 2,3-dimethylbutadiene, piperylene, 2,4-hexadiene, 2-methyl-1,3-pentadiene, 2-ethyl-1,3-butadiene, 2-propyl-1,3-butadiene, 2-phenyl-1,3-butadiene, 3-methyl-1,3-pentadiene, 2-ethyl-1,3-pentadiene, 2-methyl-1,3-hexadiene, 1-methoxy-1,3-butadiene, etc. The use of butadiene, isoprene, 2-chloro-1,3-butadiene, and piperylene is especially preferred, since the resulting maleic anhydride copolymers are inexpensive, easily prepared and readily converted to derivatives. In general, the molar ratio of conjugated diene to the maleic anhydride will range from about 5:1 to 1:5, and preferably about 1:1 since it was determined that the coploymers contain maleic anhydride and the conjugated diene in a 1:1 molar ratio, regardless of the starting ratio. For some purposes, however, it may be desirable to employ an excess of either of these reactants.

The reaction may be carried out in the presence of any organic solvent in which the monomers are soluble and which is inert towards maleic anhydride, i.e. any solvent which does not contain reactive hydrogen atoms such as alcohols, mercaptans or amines. Thus, suitable solvents include ketones, esters, ethers or aromatic or aliphatic hydrocarbons, as for example acetone, methyl ethyl ketone, cyclohexanone, ethyl acetate, butyl acetate, dioxane, tetrahydrofuran, diethylether, dipropyl ether, dibutyl ether, dimethyl ether of ethylene glycol or diethylene glycol, dibutyl ether of ethylene glycol or diethylene glycol, propylene oxide, styrene oxide, cyclohexane, benzene, toluene, xylene and the like. Alternatively, the reaction may be carried out in bulk with the maleic anhydride dissolved in the other components of the reaction mixture. Polar solvents are generally preferred since they are usually solvents for the copolymer as well as the monomers, maintain a homogeneous phase throughout the reaction period and induce or accelerate the rate of decomposition of various free radical catalysts such as organic peroxides.

The required free radicals may be provided by the use of conventional free radical polymerization catalysts such as tert-butyl peroxypivalate, benzoyl peroxide, lauroyl peroxide, azobisisobutyronitrile, etc.; or ultraviolet or gamma radiation in the presence of air; or by the use of a compound susceptible to oxidation upon exposure to air or oxygen. For example, dioxane or tetrahydrofuran which has been exposed to air and contains active oxygen, as indicated by the fact that it liberates iodine from a potassium iodide solution, may be used. Peroxide-free dioxane has been previously used as a reaction medium in many Diels-Alder reactions with maleic anhydride, and the inert character of such dioxane is demonstrated by its use in kinetic investigations to determine the order of reactivity of dienes towards maleic anhydride in the Diels-Alder reaction, e.g. as reported by Sauer, Lang and Mielert (Angew. Chem. International Edition, vol. 1, pages 268–269, 1962).

The free radical catalyst need only be present in catalytic quantities, e.g. 0.01–5% by weight based on maleic anhydride. However, the polymerization reaction must be carried out at a temperature at which radicals are rapidly generated, e.g. at a temperature at which the half-life of the catalyst, $t_{1/2}$, is 60 minutes or less. The choice of catalyst is therefore dictated by the temperature selected for the polymerization reaction. In contrast to conventional free radical polymerization reactions, the molecular weight of the polymeric product is independent of the initial catalyst concentration and is determined by the temperature of the polymerization reaction. The preferred catalyst is therefore selected on the basis of the desired molecular weight of the reaction product.

In conventional free radical polymerization processes, catalysts are generally utilized at temperatures at which they have a half-life of at least three hours. The concentration of catalyst in the reaction mixture or the rate of addition is selected so as to obtain a desired molecular weight and to maintain an easily controlled reaction temperature. In most cases it is necessary to heat the reaction mixture in order to maintain the desired rate of decomposition of the free radical catalyst.

In the present invention, catalysts are utilized at temperatures at which they have a half-life of one hour or less, preferably one half hour. The rate of addition is maintained so as to generate a high concentration of free radicals. The total addition time of the catalyst is generally less than one and one half hours, preferably from one half to one hour.

With the preferred initial catalyst concentration of 0.5 to 3% by weight, which in the case of benzoyl peroxide, tert-butyl peroxypivalate and azobisisobutyronitrile represents 0.002 to 0.0012 mole-percent based on maleic anhydride, the catalyst is added at the rate of $3 \times 10^{-5}$ to $4 \times 10^{-4}$ mole-percent per minute. The significant factor is the moles of catalyst decomposing per unit time, i.e. the number of radicals generated per unit time, rather than the moles of catalyst per mole of monomer added over the entire reaction period. Thus, the dose rate rather the total dosage is important.

As a result of the indicated rapid rate of radical generation the reaction is extremely exothermic and external cooling is generally needed to maintain the temperature at the desired level for radical generation and molecular weight control. If the rate of catalyst addition is decreased in order to maintain temperature control more easily, e.g. in carrying out large scale reactions, the yield of copolymer is decreased and the Diels-Alder adduct is produced.

While it is not desired to limit the invention by any theory of the reactions involved, it is believed that the reaction of the conjugated diene and maleic anhydride proceeds through an intermediate transition state or complex. In the absence of external energy, e.g. free radicals, the intermediate complex is rapidly converted to the Diels-Alder adduct. The rate of the Diels-Alder reaction is temperature dependent and is rapid at elevated temperatures.

In order to decrease or avoid the formation of the Diels-Alder adduct, it is necessary to expose the transition state complex to a sufficient amount of energy in the form of a high concentration of radicals so that in lieu of conversion to the cyclic adduct the complex is opened to yield a linear copolymer.

In general, the reaction temperature employed will range from about 0 to 200° C., and preferably from about 25° to 150° C. Either atmospheric or superatmospheric pressures may be employed. Although the polymerization may be carried out under an inert atmosphere, it is often convenient and desirable not to exclude air or oxygen from the system.

In accordance with one method of carrying out the present invention, a catalyst solution is prepared by dissolving a free radical catalyst such as benzoyl peroxide, tert-butyl peroxypivalate or azobisisobutyronitrile in a solvent which is to serve as the reaction medium. A catalyst solution is also produced when a solution of maleic anhydride in dioxane or dioxane alone is allowed to stand at room temperature exposed to air for several days, until the solution gives a positive peroxide test, i.e. liberation of iodine from an aqueous potassium iodide solution. Alternatively, oxygen may be bubbled through dioxane in the presence or absence of maleic anhydride until the presence of peroxide is indicated. In another embodiment of this invention, benzoyl peroxide is dissolved in dioxane, which induces the decomposition of the peroxide even at room temperature and after approximately 20 minutes, maleic anhydride is added. Exposure of a solution of maleic anhydride in dioxane or diethyl ether to ultraviolet or higher energy radiation in air may also be carried out to create a catalytically active component.

The catalyst solution may be added to a solution of the diene and maleic anhydride, or a solution containing the catalyst and the diene may be added to a solution containing the maleic anhydride, over a period of time and the temperature rapidly raised to and maintained at the desired level so as to ensure rapid decomposition of the catalyst and rapid generation of free radicals. Alternatively, the solution of maleic anhydride may be preheated before the addition of the solution containing the catalyst and the diene. Upon the addition of the diene to the maleic anhydride solution, an exothermic reaction occurs and when dioxane containing peroxides is used as the reaction medium, the heat generated is sufficient to raise the temperature to a level at which rapid decomposition of the peroxide occurs.

The temperature rise which results upon the addition of the conjugated diene to the maleic anhydride solution in the presence of the radical generator is accompanied by an increase in the viscosity of the solution. In most cases the reaction is complete as soon as the addition of the diene is completed. However, the reaction mixture is generally agitated for an additional period of time to ensure completion.

The copolymer is isolated by precipitation with a non-solvent, generally toluene, and is purified by extraction with toluene or by representation. The product is dried at room temperature or in a vacuum oven at a slightly elevated temperature in the usual manner. Other non-solvents which may be employed to precipitate the copolymers include benzene, methylene chloride, etc. It will be further understood that the exact method of recovering the copolymers from the reaction product mixture is not a critical feature of this invention, and that any of the known procedures may be readily employed.

The solubility of the copolymers is related to the molecular weight and the nature of the conjugated diene used in the synthesis. The intrinsic viscosities of these novel copolymers in water-free dimethylformamide or cyclohexanone at 25° C. may range from 0.05 to above 6 and softening points range from below 100° C. to above 200° C. Thus, a sample of isoprene-maleic anhydride copolymer having an intrinsic viscosity of 1.05 in dimethylformamide softened at 145–150° C. The copolymers with high softening points are generally insoluble in most common organic solvents, while the copolymers with intrinsic viscosities of about 1 and softening points below 150° C. may be soluble in common polar organic solvents. Thus, the isoprene-maleic anhydride copolymer of an intrinsic viscosity of 1 in dimethylformamide is soluble in acetone and methyl ethyl ketone but is insoluble in methyl isobutyl ketone and chlorinated hydrocarbons.

The novel copolymers of this invention are essentially alternating copolymers of the conjugated diene and maleic anhydride and have a structure containing as the predominant recurring unit.

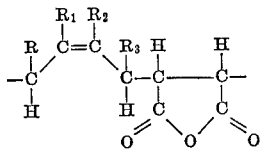

where R, $R_1$, $R_2$ and $R_3$ are as previously defined. The unsaturation in the copolymer has at least 75% and generally about 85–95% of the cis-1,4 structure.

Determination of the amount and nature of the unsaturation by infrared spectroscopy, nuclear magnetic resonance measurements and chemical reactions such as hydrogenation and ozonolysis revealed unusual aspects, indicative of the novel structure of the copolymers.

The infrared spectra of soluble polymers were recorded from films cast from acetone solution while insoluble polymers were pressed into KBr pellets. The microstructure of butadiene-maleic anhydride copolymers was determined by the base line method using the extinction coefficients of Silas, Yates and Thornton (Analytical Chemistry, 31,529 (1959)), i.e., 10.1 for cis-1,4 at 760–720 cm.$^{-1}$, 133 for trans-1,4 at 975 cm.$^{-1}$ and 184 for 1,2-vinyl at 909 cm.$^{-1}$. Analysis of a representative butadiene-maleic anhydride copolymer prepared as described in the illustrative examples indicated 90% cis-1,4, 8% trans-1,4 and 2% 1,2 vinyl structure.

Nuclear magnetic resonance analysis of the isoprene-maleic anhydride copolymers in acetone-$d_6$ or deuterated acetic acid using tetramethylsilane as internal reference indicated the presence of the

groups and 85% of the 1,4 structure. Nuclear magnetic resonance analysis of the butadiene-maleic anhydride copolymers similarly indicated 85–90% of the 1,4 structure.

Determination of the unsaturation by chemical analysis gave unusual results. Attempts to hydrogenate the isoprene-maleic anhydride copolymers using platinum oxide or palladium on charcoal as catalysts were unsuccessful. Ozonolysis of the same copolymers indicated 85% unsaturation and titration of several samples with iodine monochloride indicated 70–86% unsaturation.

The unusual results of the spectral and chemical analysis are indicative of the novel structure of the alternating copolymers of this invention. The presence of the cyclic anhydride units in the copolymers was readily detected from infrared absorption at 1220, 1775 and 1855 cm.$^{-1}$.

The invention will be more fully understood by reference to the following illustrative embodiments.

EXAMPLE I (A) A solution of 50 millimoles of redistilled maleic anhydride and 50 millimoles of purified, peroxide-free, dioxane was allowed to stand exposed to the air for 3 days. At the end of this period a potassium iodide test for peroxides gave a strong positive result. Addition of 50 millimoles of isoprene to this solution yielded a viscous solution within 20 minutes. This solution was poured into toluene and the precipitate was isolated by decantation. After extraction with toluene, which would dissolve the Diels-Alder adduct, there remained an insoluble residue which was identified as a 1:1 copolymer of isoprene and maleic anhydride. The copolymer obtained in 18% yield had a softening point of 145°–150° C., and an intrinsic viscosity of 1.05 in dimethylformamide at 25° C.

Analysis.—Calcd. for $C_9H_{10}O_3$: C, 65.0; H, 6.1. Found: C, 64.9; H, 6.2.

The copolymer was soluble in cold dimethylformamide, acetone, ethyl acetate, cellosolve acetate, cyclohexanone, and tetrahydrofuran and insoluble in dichloromethane, acrylonitrile, tetrachloroethane, toluene and benzene.

(B) A solution of 2.5 g. of redistilled maleic anhydride in 13 ml. of distilled isoprene was stirred at room temperature for 24 hours. At the end of this period the solid crystalline material which had separated was collected on a funnel.

The melting point was identical with that of the Diels-Alder adduct of isoprene and maleic anhydride, 3-methyl-tetrahydrophthalic anhydride, M.P. 62–64° C.

(C) The procedure of Run B was repeated except that instead of using an excess of isoprene, the materials were employed in equimolar ratios. As in Run B, the isolated product was identified as the Diels-Alder adduct.

(D) In a 500 ml. round bottomed flask was placed 50 g. (0.51 moles) of maleic anhydride and 100 ml. (103 g.) of dioxane (containing 0.019% peroxide by idometric titration). The solution was cooled to 0° C. and 33.7 g. (0.51 mole) of isoprene was added. The flask was quickly placed in a freezer chest. After 90 minutes a vigorous exothermic reaction occurred. After cooling and standing overnight, the reaction mixture was refluxed for 3 hours. Dioxane in excess of 0.51 mole was distilled out of the reaction vessel and the residue was allowed to cool. The mixture was then allowed to stand 24 hours in the freezer chest. The crystals which had formed were collected on a funnel and dried in air. The first crop of crystals weighed 44 g. (52% of theory) and melted at 62–64° C. A second crop weighing 16 g. (20%) was also isolated. The product was shown to be the Diels-Alder adduct by mixed melting point with authentic material.

EXAMPLE II

To a 2-liter flask, equipped with stirrer, thermometer, and reflux condenser was charged 509 g. (5.19 moles) of redistilled maleic anhydride, and 458 g. (5.19 moles) of redistilled dioxane. This solution was heated to 100° C. whereupon a color change, first to pink and then to yellow was noted. A solution of 2.545 g. of azobisisobutyronitrile in 354 g. (5.19 moles) of redistilled isoprene was then added over a 35 minute period. The reaction temperature rose to 123±3° and remained there throughout the addition, during which the reaction mixture became quite viscous. After an additional 30 minutes of heating at 100° C., the polymer was isolated by precipitation by addition to toluene. The powdery polymer was collected on a funnel, washed with petroleum ether and dried in a vacuum oven at 50–60° C. The yield of polymer was 268 g. (31% of theory). It was dissolved in acetone and reprecipitated with benzene in 85% recovery. The polymer had a softening point (sticking temperature) of 143° C. The intrinsic viscosity of the reprecipitated polymer was measured in cyclohexanone at 25° C. and found to be 0.15. This corresponds to a molecular weight of 3,590 (determined ebullioscopically with a vapor pressure osmometer).

EXAMPLE III (A) Into a reaction vessel was charged 4.9 g. (50 millimoles) of purified maleic anhydride and 11.1 g. of purified diethyl ether. This solution was then exposed to air and irradiated with ultraviolet radiation for 60 minutes whereupon the solution became red purple in color. Isoprene (6.8 g.; 100 millimoles) was then added, and the solution stirred for two hours during which time it became quite viscous. After precipitation with toluene and washing, the product was identified as the copolymer of maleic anhydride and isoprene, in a yield of 3.0 g. (20% of theory).

(B) When Run A was repeated except that precautions were taken to exclude air or oxygen (by stirring under nitrogen during irradiation and after addition of the isoprene) a quantitative yield of the Diels-Alder adduct, 3-methyltetrahydrophthalic anhydride, was obtained.

EXAMPLE IV (A) Into a flask equipped with a stirrer and gas inlet tube was placed 0.1 g. of benzoyl peroxide. The flask was then flushed with nitrogen for 30 min. and 4.3 ml. (50 millimoles) purified dioxane added. While stirring, 6 ml. (50 millimoles) of molten redistilled maleic anhydride was added. Since dissolution of maleic anhydride in dioxane is endothermic, the benzoyl peroxide-dioxane-maleic anhydride solution came to approximately ambient temperature (20°–30° C.). After allowing this solution to stir for 20 minutes, a red color developed. At this point 5.0 ml. (50 millimoles) of isoprene was added. Within 1 minute a vigorous exothermic reaction occurred and the viscosity of the solution increased markedly.

The copolymer was precipitated with toluene, separated by decantation, extracted and washed with additional toluene. The yield of copolymer was 3.5 g. (42% of theory).

(B) When Run A was repeated except that freshly distilled chloroprene (2-chlorobutadiene) was added to the red peroxide-dioxane-maleic anhydride solution, as before, a rapid exothermic rise was noted as well as a marked increase in viscosity. Workup of the product by precipitation with toluene and extraction yielded the maleic anhydride-chloroprene copolymer in 87% yield. The copolymer had a softening point of 95–100° C. and an intrinsic viscosity in dimethylformamide at 25° C. of 0.41.

(C) The procedure of Run A was repeated except that 2,3-dichlorobutadiene was used in place of isoprene. As before a vigorous exothermic reaction occurred within 1 minute and an increase in viscosity was observed. The polymer isolated in the usual manner in 67% yield was found to be a copolymer of maleic anhydride and 2,3-dichlorobutadiene by IR analysis. The copolymer had a softening point of 85–90° C. and was insoluble in common organic solvents including dimethylformamide at 25° C.

(D) Substitution of piperylene (1,3-pentadiene) for isoprene under the conditions of Run A gave a 41% yield of maleic anhydride-piperylene copolymer, softening point 85–90° C., intrinsic viscosity in dimethylformamide at 25° C. of 0.31.

(E) Substitution of 2,3-dimethylbutadiene for isoprene under the conditions of Run A gave a copolymer of maleic anhydride and 2,3-dimethylbutadiene in 24% yield. The copolymer had a softening point of 120–125° C. and an intrinsic viscosity in dimethylformamide at 23° C. of 0.18.

EXAMPLE V

To a reaction vessel equipped with Teflon covered magnetic bar stirrer and thermometer was added 4.3 ml. of peroxide-free dioxane, 6 ml. (4.9 g., 50 millimoles) purified maleic anhydride (added as a liquid at 60° C.), 0.1 g. benzoyl peroxide and the solution allowed to cool to room temperature. While blanketing the reaction mixture with nitrogen the flask was stirred for 20 minutes whereupon a red color developed. Then 5.8 ml. (4.05 g., 50 millimoles) of 2,4-hexadiene was added. Polymer formed immediately as indicated by a viscosity increase of the reaction mixture. Precipitation from toluene yielded 4.1 g. (46%) of polymer, softening point 175–178° C., intrinsic viscosity in dimethylformamide at 25° C. of 0.25.

EXAMPLE VI

The maleic anhydride-isoprene copolymer, Run A, Example IV, was dissolved in ethyl acetate and/or acetone and a film cast from this solution. The film was extremely hard and tough. It had excellent gloss and strongly adhered to the glass. Flexible self supporting films having good elongation were prepared by evaporating solvent from ethyl acetate solutions cast on aluminum foil and stripping the film. The products of Runs B, D and E of Example IV were also shown to be film formers by the same technique.

EXAMPLE VII (A) The procedures described in Run D, Example I were repeated except that in this case 100 ml. (94.4 g.) of tetrahydrofuran was used as solvent. The maleic anhydride was readily soluble in this solvent at room temperature. There was a vigorous exotherm, after a 4 hour induction period.

Workup of the product as described in Run D, Example I gave a 61 g. (73%) yield of fine white prisms melting at 63–64° C. A mixed M.P. with the product obtained from dioxane was 62–64° C. The product is therefore the Diels-Alder adduct.

(B) To a 100 ml. 3 necked flask equipped with reflux condenser swept with nitrogen, and a magnetic stirrer, was added 4.9 g. (50 millimoles) maleic anhydride, 5 ml. of peroxide-free tetrahydrofuran and 0.1 g. benzoyl peroxide. Isoprene (5.0 ml.; 3.4 g.; 50 millimoles) was then added with stirring. Within 15 seconds a vigorous exothermic reaction was observed with a corresponding increase in viscosity. Stirring was continued for 20 min.

The maleic anhydride-isoprene copolymer, having a softening point of 90°–95° C., was isolated by precipitation with benzene. The yield was 1.6 g. (20%).

(C) To a flask equipped as described above were added maleic anhydride (50 millimoles), tetrahydrofuran (5.0 ml.) and benzoyl peroxide (0.1 g.). The reaction vessel was then exposed to ultraviolet irradiation and as quickly as possible thereafter the isoprene (50 millimoles) was added. A rapid exothermic reaction and increase in viscosity (as above) was observed.

The maleic anhydride-isoprene copolymer was isolated by precipitation with benzene. In this case the yield was 0.8 g. (10%), and the softening point of the copolymer was 138°–140° C.

(D) To a reaction vessel equipped as described above was charged maleic anhydride (50 millimoles), and tetrahydrofuran (5.0 ml.). In this case the benzoyl peroxide was omitted. The solution was exposed to the ultraviolet radiation and in the absence of air the isoprene (50 millimoles) rapidly added. Within 15 seconds a vigorous exotherm was observed, but in this case no viscosity increase was noted.

Addition of the reaction mixture to benzene as above yielded no precipitate. Concentration of the solution by evaporation and cooling of the solution yielded, after recrystallization, white prisms melting at 63°–64° C.

A mixed melting point with an authentic sample melted at 63°–64° C.

The yield of recrystallized Diels-Alder product, 3-methyltetrahydrophthalic anhydride obtained in this experiment was 4.1 g. (49%).

EXAMPLE VIII

To a 100 ml. 3-necked reaction vessel equipped with a magnetic stirrer, gas inlet tube, condenser and thermometer was charged 15 g. (0.153 mole) of maletic anhydride, 13 ml. of peroxide-free dioxane and 0.25 g. of benzoyl peroxide.

After stirring 5 minutes butadiene (7.7 g., 0.153 mole) were added by distillation through a tube dipping under the reaction surface. After an induction period of 8 minutes a vigorous exotherm and increase in viscosity was observed.

The maleic anhydride-butadiene copolymer (2.0 g., 9%) was isolated by precipitation with benzene.

The copolymer softened at 135° to 145° C. and was soluble in dimethylformamide and acetone.

EXAMPLE IX

To a flask equipped as described in Example II was charged 513 g. (5.23 moles) of purified maleic anhydride and 462 g. purified dioxane. This solution was heated to 70° C. and a solution of 3.42 g. of tert-butyl perpivalate (75% in mineral spirits, equivalent to 2.56 g. of pure tert-butyl perpivalate) in 356 g. (5.23 moles) of isoprene added over a 75 minute period. In this case external cooling was required to maintain the temperature at 70±3° C. during the polymerization. After about one-third of the isoprene-catalyst solution had been added the viscosity increased greatly. Periodically dioxane was added to keep the reaction mixture stirrable. A total of 448 ml. of dioxane was added for this purpose. After addition of all of the isoprene-catalyst solution, stirring was continued for an additional 45 minutes. p-tert-Butyl cresol (1 g.) was added to the solution and the polymer was isolated as before, via precipitation by pouring the dioxane solution which had been diluted with acetone, slowly into a stirred container of benzene. In this case, however, instead of the polymer being powdery it was fibrous. The initial yield of the fibrous white polymer, which was very light and fluffy on drying was 336 g. (38.6%) of which 80% was recovered on reprecipitation. Reprecipitation was carried out by dissolving the polymer in acetone (8 ml./g. of polymer) and slowly dropping the acetone solution into benzene (3 volumes of benzene/volume of acetone). The polymer was washed with petroleum ether and dried in a vacuum oven at 65° C.

This fibrous polymer was found to have a softening point (sticking temperature) of 152° C. and an intrinsic viscosity measured in cyclohexanone at 25° C. of 3.2.

Elemental analysis.—Calcd. for $(C_9H_{10}O_3)_x$: C, 65.1; H, 6.1. Found C, 64.7; H, 6.1.

The infrared spectrum of this material was identical to that of the lower molecular weight material of Example II.

EXAMPLE X

Purified maleic anhydride (213 g.; 2.17 moles) and purified dioxane (191 g.; 2.17 moles) were charged to a reaction vessel equipped as described in Example II. The solution was heated to 100° C. and with external cooling, maintained at that temperature while a solution of 1.065 g. of azobisisobutyronitrile in 192 g. (2.17 moles) of chloroprene (distilled from a 50% solution in xylene) was rapidly added over a 20 minute period. The solution became very viscous. After an additional 40 minutes of stirring the polymer was isolated in the usual manner, after the addition of p-t-butyl cresol, by precipitation from benzene. There was isolated 195.2 g. (48% of theory) of stringy white polymer. The intrinsic viscosity of this polymer after reprecipitation was 1.00, measured in cyclohexanone at 25° C., and the softening point was 148–150° C. Calcd. for $C_9H_9O_3Cl$; C, 51.50; H, 3.78. Found C, 51.84; H, 4.03.

EXAMPLE XI

To a 250 ml. flask equipped with stirrer, thermometer and reflux condenser was charged 5.0 g. (0.05 mole) maleic anhydride and 7 ml. (0.081 mole) dioxane. The temperature was raised to 70° C. A solution of 4.29 g. (0.051 mole) 1-methoxy-butadiene and t-butylperoxy-pivalate, 0.04 ml. of a 75% solution (0.5% of maleic anhydride), was added. An exothermic reaction took place and the temperature rose from 70 to 78°. Addition time was 10 minutes. Upon addition of diene and catalyst a green color appeared which disappeared with time. Reaction temperature was 65–75° for 1 hour. At the end of the reaction 50 ml. acetone was added and the solution was poured into a large quantity of benzene which precipitated the polymer. The polymer was collected on a filter, washed with benzene and petroleum ether containing Ionol. It was dried in vacuo at 50–60° for 4 hours. The yield of polymer was 3.8 g. (41.0% of theory). It has a softening point (sticking point) of 168° C. An intrinsic viscosity of 0.53 was obtained in cyclohexanone at 25°.

Elemental analysis.—Calcd. for $(C_9H_{10}O_4)_x$, C, 59.3; H, 5.5. Found, C, 58.9; H, 5.6.

The foregoing examples demonstrate that novel copolymers of maleic anhydride and various conjugated dienes can be prepared with the process of this invention. It has also been shown that the presence of a high concentration of free radicals is essential in order to obtain the desired products. In the absence of a free radical source or a sufficient concentration of free radicals, the reaction of the maleic anhydride with the conjugated diene will result in the formation of the known Diels-Alder adducts.

The novel nature of the copolymers prepared with the process of this invention resides in their unique structure which is that of an unsaturated 1:1 alternating copolymer of maleic anhydride and a conjugated diene, the unsaturation being predominantly stereoregular with at least 75% in the form of cis-1,4 structural units.

The regular cis-1,4 structure of the alternating unsaturation apparently arises from the intermediate complex which is common to both the Diels-Alder adduct, which is obtained in the absence of a high concentration of free radicals, and the copolymer which is obtained in the presence of a high concentration of radicals. It is well known that the Diels-Alder adduct contains cis-1,4 unsaturation. The following reaction sequence clearly demonstrates the relationship between the cyclic adduct and the linear copolymer, using butadiene as the conjugated diene for the illustration:

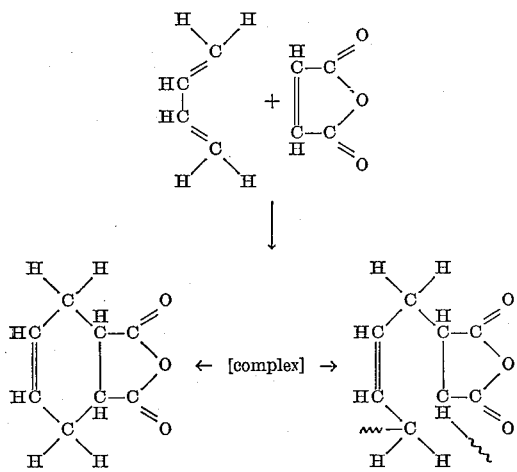

The novel copolymers of this invention may be converted into numerous derivatives by any of the known reactions for organic compounds containing anhydride groups. Thus, for example, the copolymers containing anhydride groups may be reacted with monohydric alcohols to produce recurring units which are monoester acids or diesters, depending upon the relative amount of alcohol and the reaction conditions. Analogously, the anhydride groups may be reacted with amines to yield monoamide acids or diamides or imides. Hydrolysis of the anhydride groups yields dicarboxylic acids which may in turn be converted to mono- or dicarboxylic acid salts such as the sodium, potassium or calcium salts. Alkali metal salts may also be prepared directly by reaction of the polyanhydride with an aqueous solution of the desired cation. Analogously, the mono- or diammonium salts as well as the monoamide-monoammonium salt may be prepared by reaction of the anhydride groups with ammonium hydroxide. Since the copolymer contains numerous anhydride groups, by controlling the quantity of reagent it is possible to control the extent of reaction so that, for example, only a few or all of the anhydride groups undergo reaction.

The aforementioned derivatives are prepared by reactions of the anhydride groups and consequently do not influence the nature or amount of unsaturation. Thus, the monoester acids, diesters, monoamide acids, diamides, imides, dicarboxylic acids, monocarboxylic acid salts, dicarboxylic acid salts, monoamide-monoammonium salts, etc., are 1:1 alternating copolymers containing at least 75% cis-1,4 unsaturation.

Since maleic monoester acids, diesters, monoamide acids, diamides, dicarboxylic acid, monocarboxylic acid salts, monoamide-monoammonium salts, etc., either do not undergo reaction with conjugated dienes to produce Diels-Alder adducts or undergo reaction only with reluctance, it would be expected that if copolymers are produced by reaction of such maleic acid derivatives with conjugated dienes in the presence of free radicals, the structure of these copolymers would be different from that of the copolymers produced by appropriate reactions of the maleic anhydride copolymers. Thus, in lieu of having the structure of 1:1 alternating copolymer containing at least 75% cis-1,4 unsaturation, the copolymers produced by free radical-initiated copolymerization of a maleic acid derivative with a conjugated diene would have the copolymer composition and unsaturation, resulting from a conventional free radical-initiated copolymerization which does not proceed through an intermediate complex.

Copolymers of a conjugated diene with an α,β-ethylene dicarboxylic acid derivative having a free carboxylic acid group are claimed in U.S. Patent 2,967,174 and its equivalents, Canadian Patent 592,794 and British Patent 818,715. The process described therein involves heating in the presence of a free radical-forming polymerization catalyst, a mixture of (a) a monoester of maleic acid and (b) a polymerizable monoethylenically unsaturated compound such as styrene, followed by the addition of a conjugated aliphatic diolefin of 4–6 carbon atoms. The vinyl monomer such as styrene is utilized to reduce or avoid the formation of the cyclic adduct.

Example XII was carried out according to the procedure described in Example 3 of these patents.

EXAMPLE XII

A mixture of 190 g. of monomethyl maleate, 15.2 g. of styrene and 0.146 g. of benzoyl peroxide were heated for 15 minutes at 90° C. in a stirred autoclave. A mixture of 79 g. of butadiene, 284 g. of methanol and 2.78 g. of benzoyl peroxide was then introduced under pressure into the reaction chamber at a rate such that the polymerization temperature was maintained between 90 and 95° C. After the addition of the butadiene mixture was completed, the reaction mixture was heated at 90° C. for 5 hours. The resultant solution was concentrated in vacuo at 50–70° C. and the isolated polymer was washed with a 1:1 (by volume) mixture of benzene and petroleum ether in order to remove methanol and unreacted monomers. The polymeric product, after drying in vacuo at 60%, weighed 71.7 g. (25.2% yield) and had an intrinsic viscosity of 0.18 in cyclohexanone at 25° C.

Infrared analysis was used to determine the styrene content of the polymer. Using a 1:1 styrene-maleic anhydride copolymer as well as the monomethyl ester thereof prepared by esterification with methanol, the absorption intensity ratios $D_{699}/D_{1439}$ were calculated and used in the preparation of calibration curves of absorption ratio versus styrene content.

The styrene content of the polymer, as determined from the calibration curves, was 10.0 mole-percent.

The elemental analysis of the polymer and calculations based on various monomer contents are summarized in Table I.

TABLE I

| Elemental Analysis | Monomer mole, percent | C, percent | H, percent |
| --- | --- | --- | --- |
| Found | | 60.1 | 6.5 |
| Calculated: | | | |
| Butadiene-monomethyl maleate | 50–50 | 58.7 | 6.5 |
| Do | 45–45 \} 10 | 60.7 | 6.6 |
| Styrene | | | |
| Butadiene-monoethyl maleate | 40–50 \} 10 | 60.6 | 6.4 |
| Styrene | | | |
| Butadiene-monomethyl maleate | 37–53 \} 10 | 59.6 | 6.2 |
| Styrene | | | |

The analytical data, in agreement with the infrared analysis, indicate that the polymeric product is a terpolymer containing 10% styrene, 37–45% butadiene and 45–53% monomethyl maleate on a molar basis.

The microstructure of the unsaturation in the terpolymer, determined by infrared analysis as previously described, consisted of 87.3% trans-1,4, 0% cis-1,4 and 12.2% 1,2-vinyl units.

Although 7 out of the 8 examples in the cited patents illustrate the use of styrene in the preparation of the polymeric products, it is further claimed that this polymerizable vinyl monomer may be omitted from the polymerization mixture and Example 2 of these patents is illustrative thereof.

Example XIII was carried out in a manner identical to that described in Example XII, with the omission of styrene.

EXAMPLE XIII

Monomethyl maleate, 190 g., was heated to 90° C. in a stirred autoclave and then a mixture of 79 g. of butadiene, 284 g. of methanol and 2.78 g. of benzoyl peroxide was introduced into the reaction chamber at a rate such that the polymerization temperature was maintained at 90–95° C. Upon completion of the addition of the butadiene solution, the reaction mixture was heated at 90° C. for an additional 5 hours. Concentration of the solution in vacuo at 50–70° C., followed by washing of the isolated reaction product with a 1:1 (volume) mixture of benzene and petroleum ether and drying at 60° C. in vacuo, gave 26.0 g. (9.7% yield) of polymer which had an intrinsic viscosity of 0.03 in cyclohexanone at 25° C.

The elemental analysis of the polymer and calculated monomer content on a molar basis: Found: C, 57.0; H, 6.0. Calculated: 50 butadiene-50 monomethyl maleate C, 58.7; H, 6.5; 45 butadiene-55 monomethyl maleate C, 57.0; H, 6.3.

The microstructure of the polymers contained 88.0% trans-1,4, 0% cis-1,4 and 12.0% 1,2-vinyl units.

It is apparent from Examples XII and XIII that the free radical-initiated copolymerization of a conjugated diene and an α,β-unsaturated dicarboxylic acid derivative having a free carboxylic acid group, i.e. a monoester of maleic acid, in the absence or presence of a polymerizable monomer such as styrene, yields a copolymer which is not a 1:1 alternating copolymer and in which the unsaturation is predominantly trans-1,4 with little or no cis-1,4 structure. This is clearly quite different from the novel 1:1 alternating copolymer with predominantly cis-1,4 unsaturation resulting from the present invention.

U.S. Patent 2,967,174, British Patent 818,715 and Canadian Patent 592,794 teach that in the copolymerization of a conjugated diene and an α,β-ethylene dicarboxylic acid derivative having a free carboxylic acid group, the latter may be replaced by maleic anhydride. Further, claim 5 of Canadian Patent 592,794 describes "a copolymer of (1) 0.5–2 moles of a conjugated aliphatic diolefin with 4–6 carbon atoms, (2) 1 mole of a monomer selected from the group consisting of an anhydride of an α,β-ethylenically unsaturated dicarboxylic acid, a monoester of said acid with a monohydric alcohol devoid of aliphatic carbon-to-carbon unsaturation and a monoamide of said acid, and (3) 0–1 mole of at least one further polymerizable monoethylenically unsaturated compound." Thus, the copolymers of a conjugated diene and either maleic anhydride, a maleic acid monoester or a maleic acid monoamide are grouped as a family of copolymers of analogous structure and the anhydride, monoester and monoamide constitute a group which yields analogous copolymers.

The intent to describe analogous copolymers is further shown in British Patent 818,715 in which claim 1 claims "copolymers of (1) conjugated diolefinic hydrocarbon or monohalogen substituted derivative thereof and (2) an α,β-ethylene dicarboxylic acid derivative having a free carboxylic acid group, in which the molar ratio of component 1: component 2 is from 1:1 to 2:1," claim 2 which claims "copolymers as claimed in claim 1, wherein the component (2) is a half ester of maleic acid with a monohydric alcohol," and claim 3 which claims "copolymers as claimed in claim 1, modified in that the component (2) is maleic anhydride."

Thus, the cited patents teach that analogous copolymers are prepared from maleic anhydride, the monoester and the monoamide. It is further taught that products similar to those obtained by copolymerization of the monoester can also be obtained if the conjugated dienes are polymerized with maleic anhydride and the polymers are subsequently esterified.

The analytical data in Examples XII and XIII indicate that the copolymers of butadiene and monomethyl maleate, prepared in the absence or presence of styrene, have more than 85% trans-1,4, 0% cis-1,4 and less than 15% 1,2-vinyl structure. In addition, the molar ratio of conjugated diene to maleic acid monoester is less than 1:1, although the claims of the patents which describe the procedure used in these examples teach copolymers in which the molar ratio is 1:1 to 2:1.

Since the cited patents teach that replacement of the maleic acid monoester with maleic anhydride yields analogous copolymers, the maleic anhydride copolymers taught therein also have more than 85% trans-1,4, 0% cis-1,4 and less than 15% 1,2-vinyl unsaturation and a molar ratio of conjugated diene to maleic anhydride of less than 1:1.

The novel copolymers of the present invention which contain the conjugated diene and maleic anhydride in a 1:1 molar ratio and contain at least 75% and generally 85–95% cis-1,4, less than 10% trans-1,4 and less than 5% 1,2-vinyl unsaturation are therefore not anticipated by U.S. Patent 2,967,174 and its equivalents Canadian Patent 592,794 and British Patent 818,715.

Claim 1 of Canadian Patent 592,794 teaches a process whereby free radical copolymerization of (a) 1 mole of a monomer selected from the group consisting of an α,β-ethylenically unsaturated dicarboxylic acid anhydride, half esters of the unsaturated dicarboxylic acid and a monoamide of said dicarboxylic acid, (b) 0–1 mole of a further polymerizable monoethylenically unsaturated compound, e.g. styrene, and (c) 0.5–2 moles of a conjugated aliphatic diolefin of 4–6 carbon atoms, yields a high molecular copolymer of the aforementioned components which is soluble in toluene. This claim therefore teaches that by the process taught therein copolymers of maleic anhydride and a conjugated diene, containing 0 mole of a polymerizable monomer such as styrene, as well as terpolymers of maleic anhydride, a conjugated diene and styrene, the latter present in an amount more than 0 and up to and including 1 mole, are obtained which are soluble in toluene.

The novel copolymers of maleic anhydride and a conjugated diene prepared by the present invention are distinctly different from those taught in the cited patents in that they are insoluble in toluene or other aromatic hydrocarbons irrespective of molecular weight. Thus, both the copolymer described in Example II of the present invention having an intrinsic viscosity of 0.15 and the copolymer described in Example IX having an intrinsic viscosity of 3.2 are insoluble in aromatic hydrocarbons.

It is possible that the solubility in aromatic hydrocarbons of the maleic anhydride-conjugated diene polymers of the prior art results from the presence of styrene in the terpolymer. Example 6 in each of the cited patents describes the terpolymerization of maleic anhydride, butadiene and styrene, and although, as previously shown, the claims extend the range of applicable styrene content to as low as 0%, no such example is given.

The aforementioned facts lead to the conclusion that the prior art is in error in teaching that similar copolymers with conjugated dienes are obtained when monoesters of maleic acid are replaced by maleic anhydride and in teaching that similar copolymers are obtained when styrene is omitted from the polymerizing monomer mixture which contains maleic anhydride as well as when it is present.

The novel conjugated diene-maleic anhydride copolymers of the present invention can be used as coatings or as self-supporting films, as demonstrated in Example VI. It is also possible to form the copolymers into many shaped products or articles utilizing conventional molding and other techniques well known to the art. Moreover, these copolymers may be converted into numerous derivatives by any of the known reactions for organic compounds containing anhydride groups. Thus, the copolymers containing anhydride groups may be converted to carboxylic acids, salts, monoesters, diesters, monoamides, diamides, imides, etc.

Since the reactions of the anhydride groups of the diene-maleic anhydride copolymers do not involve participation of the unsaturation, the derivatives of the alternating diene-maleic anhydride copolymers have the same microstructure as the parent diene-maleic anhydride copolymers, that is, more than 75% cis-1,4, less than 10% trans-1,4 and less than 5% 1,2-vinyl unsaturation.

Chemical analysis of the unsaturation in the derivatives of the diene-maleic anhydride copolymers also demonstrated the novelty of these derivatives as compared to those prepared by direct copolymerization of the conjugated diene and the appropriate maleic acid derivatives. Thus, whereas both isoprene-monomethyl maleate copolymer prepared by direct copolymerization and the analogous copolymer prepared by monoesterification of the isoprene-maleic anhydride copolymer, analyzed for more than 70% unsaturation by titration with iodine monochloride, hydrogenation indicated more than 60% unsaturation in the former and 0% in the latter. This is apparently related to the reactivity towards hydrogenation of the trans-1,4-unsaturation in the diene-maleic monoester copolymer prepared by direct copolymerization as compared with the resistance to hydrogenation of the alternating cis-1,4 unsaturation in the diene-maleic anhydride copolymer as well as the monoester prepared therefrom.

The preparation of the derivatives of the alternating conjugated diene-maleic anhydride copolymers is illustrated in the following examples.

EXAMPLE XIV

Diene-maleic monoester copolymers (A) A 250 ml. flask was charged with 5.0 g. of the low molecular weight isoprene-maleic anhydride copolymer from Example II. Ethyl alcohol, 15.0 ml., was added and the mixture refluxed until a clear solution was obtained, 60 minutes. After cooling, addition of water caused the half ester to precipitate. It was purified by dissolving in acetone and precipitating by addition of petroleum ether. The polymer was collected and dried in vacuo at 50–60° for 15 hours. The yield of half ester was 5.4 g. (84.4% of theory). A softening point (sticking point) of 152–54° was observed. An intrinsic viscosity of 0.17 was obtained in cyclohexanone at 25°.

(B) A 250 ml. flask was charged with 5.0 g. of the low molecular weight isoprene-maleic anhydride copolymer from Example II. n-Butyl alcohol, 12.5 ml., was added and the mixture refluxed until a clear solution was obtained, 45 minutes. After cooling, addition of petroleum ether caused the half-ester to precipitate. It was purified by dissolving in acetone and precipitating by addition of petroleum ether. The polymer was collected and dried in vacuo at 50–60° for 15 hours. The yield of half ester was 4.3 g. (59.5% of theory). A neutralization equivalent of 230 was found (calcd. 240). The polymer had a softening point (sticking point) of 132–34°. An intrinsic viscosity of 0.22 was obtained in cyclohexanone at 25°.

(C) A 250 ml. flask was charged with 5.0 g. of the low molecular weight isoprene-maleic anhydride copolymer from Example II. 2-butoxyethanol (butyl Cellosolve), 4.3 ml., was added and the mixture refluxed until a clear solution was obtained, 30 minutes. After cooling, addition of petroleum ether caused the half-ester to precipitate. It was purified by dissolving in acetone and precipitating by addition of petroleum ether. The polymer was collected and dried in vacuo for 15 hours at 50–60°. The yield of half ester was 4.5 g. (52.7% of theory). A neutralization equivalent of 281 was found (calcd. 284). An intrinsic viscosity of 0.21 was obtained in cyclohexanone at 25°. The polymer had a softening point (sticking temperature) of 97–100°.

(D) A 250 ml. flask was charged with 5 g. of the high molecular weight isoprene-maleic anhydride copolymer from Example IX. Ethyl alcohol, 50 ml. was added and the mixture refluxed for 1 hour. The polymer did not dissolve but swelled considerably. After washing several times with water the powdery product was dried in a vacuum oven at 50–60° for 24 hours. The yield of half ester was quantitative. It had a softening point (sticking point) of 140–42°. An intrinsic viscosity of 0.40 was obtained in cyclohexanone at 25°.

(E) A 250 ml. flask was charged with 5 g. of the high molecular weight isoprene-maleic anhydride copolymer from Example IX. n-Butyl alcohol, 60 ml. was added and the mixture refluxed for 1 hour. The polymer did not dissolve but swelled considerably. After cooling, the polymer was triturated with petroleum ether. After washing several times with petroleum ether the powdery product was dried in a vacuum oven at 50–60° for 24 hours. The yield of half ester was 4.5 g. (62.1% of theory). It had a softening point of 132–34°. An intrinsic viscosity of 0.42 was obtained in cyclohexanone at 25°.

(F) A 250 ml. flask was charged with 5 g. of the high molecular weight isoprene-maleic anhydride copolymer from Example IX. 2-butoxyethanol, 50 ml., was added and the mixture refluxed for 1 hour. The polymer did not dissolve but swelled considerably. After cooling, the polymer was triturated with petroleum ether. After washing several times with petroleum ether the powdery product was dried in vacuo at 50–60° for 24 hours. The yield of half ester was 6.1 (70.9% of theory). It had a softening point (sticking point) of 114–18°.

(G) A 250 ml. flask was charged with 5.0 g. of the chloroprene-maleic anhydride copolymer from Example X. Ethyl alcohol, 50 ml., was added and the mixture refluxed for 2 hours. The polymer did not dissolve but swelled considerably. After cooling, the polymer was triturated with water. After washing several times with water the polymer was filtered and dried in vacuo for 15 hours at 50–60°. The yield of half ester was 2.6 g. (44.9% of theory). It had a softening point of 155–57°. An intrinsic viscosity of 1.32 was obtained in cyclohexanone at 25°.

(H) A 250 ml. flask was charged with 5.0 g. of the chloroprene-maleic anhydride copolymer from Example X. n-Butyl alcohol, 15 ml., was added and the mixture refluxed for 15 hours. The polymer did not dissolve but swelled considerably. After cooling, the polymer was triturated with petroleum ether. After washing several times with petroleum ether the polymer was filtered and dried in vacuo for 15 hours at 50–60°. The yield of half-ester was 5.1 g. (73.1% of theory). It had a softening point of 98–100°. An intrinsic viscosity of 0.58 was obtained in cyclohexanone at 25°.

(I) A 250 ml. flask was charged with 5.0 g. of the chloroprene-maleic anhydride copolymer from Example X. 2-butoxyethanol (butyl Cellosolve), 20 ml., was added and the mixture refluxed for 2 hours. The polymer dissolved in the reaction medium. After cooling, addition of water caused the half-ester to precipitate. After washing several times with water the polymer was filtered and dried in vacuo for 15 hours at 50–60°. The yield of half ester was 5.5 g. (67.3% of theory). It had a softening point of 94–96°. An intrinsic viscosity of 0.15 was obtained in cyclohexanone at 25° C.

EXAMPLE XV

Diene-maleic diester copolymers (A) A 250 ml. flask was charged with 5.0 g. of the low molecular weight isoprene-maleic anhydride copolymer from Example II. Ethyl alcohol, 80 ml., and p-toluenesulfonic acid, 0.5 g., were added and the mixture refluxed for 16 hours in a nitrogen atmosphere. The diester was isolated by distilliing the excess alcohol and precipitating with water. The diester was collected, dissolved in acetone and precipitated with petroleum ether. The polymer was collected and washed with a 0.5–2% sodium bicarbonate solution and then with water. It was dried in vacuo at 50–60° for 20 hours. The yield of diester was 1.5 g. (22.4% of theory). It had a softening point (sticking point) of 118–120°. An intrinsic viscosity of 0.10 was obtained in cyclohexanone at 25° C.

(B) A 250 ml. flask was charged with 5.0 g. of the low molecular weight isoprene-maleic anhydride copolymer from Example II. n-Butyl alcohol, 65 ml., and p-toluenesulfonic acid, 0.5 g., were added and the mixture refluxed for 7½ hours in a nitrogen atmosphere. The diester was isolated by distilling the excess alcohol and precipitating with water. The diester was collected, dissolved in acetone and precipitated with petroleum ether. The polymer was collected and washed with a 0.5–2% sodium bicarbonate solution and then with water. It was dried in vacuo at 50–60° for 20 hours. The yield of diester as 2.7 g. (30.2% of theory). It had a softening point (sticking point) of 69–72°. An intrinsic viscosity of 0.09 was obtained in cyclohexanone at 25°.

(C) A 250 ml. flask was charged with 5.0 g. of the low molecular weight isoprene-maleic anhydride copolymer from Example II. 2-butoxyethanol (butyl Cellosolve), 60 ml., and p-toluenesulfonic acid, 0.5 g., were added and the mixture refluxed for 8 hours in a nitrogen atmosphere. The diester was isolated by distilling the excess alcohol and precipitating with water. The diester was collected, dissolved in acetone and precipitated with petroleum ether. The polymer was collected and washed with a 0.5–2% sodium bicarbonate solution and then with water. It was dried in vacuo at 50–60° for 20 hours. The yield of diester was 3 g. (25.8% of theory). It had a softening point (sticking point) of less than 20°. An intrinsic viscosity of 0.13 was observed in cyclohexanone at 25°.

(D) A 250 ml. flask was charged with 5 g. of the high molecular weight isoprene-maleic anhydride copolymer from Example IX. Ethyl alcohol, 100 ml., and p-toluenesulfonic acid, 0.5 g., were added and the mixture refluxed for 24 hours in a nitrogen atmosphere. The polymer did not dissolve, but swelled. Upon completion of the reaction the resulting mixture was treated with water and the polymer isolated. After collecting on a filter the polymer was washed several times with 5% sodium bicarbonate solution and then with water. The polymer was dried in vacuo at 50–60° for 24 hours. The yield of diester was 3.7 g. (55.4% of theory). It had a softening point (sticking point) of 134–38°. An intrinsic viscosity of 1.33 was obtained in cyclohexanone at 25°.

(E) A 250 ml. flask was charged with 5 g. of the high molecular weight isoprene-maleic anhydride copolymer from Example IX. n-Butanol, 100 ml., and 0.5 g. p-toluenesulfonic acid were added and the mixture refluxed for 24 hours in a nitrogen atmosphere. The polymer did not dissolve but swelled. Upon completion of the reaction the resulting mixture was treated with water and the polymer isolated. After collecting on a filter the polymer was washed several times with 5% sodium bicarbonate solution and then with water. It was dried in vacuo at 50–60° for 24 hours. The yield of diester was 3.3 g. (37% of theory). It had a softening point (sticking point) of less than 40°. An intrinsic viscosity of 1.31 was obtained in cyclohexanone at 25°.

(F) A 250 ml. flask was charged with 5 g. of the high molecular weight isoprene-maleic anhydride copolymer from Example IX. 2-butoxyethanol (butyl Cellosolve), 100 ml., and p-toluenesulfonic acid, 0.5 g., were added and the mixture refluxed for 24 hours in a nitrogen atmosphere. The polymer did not dissolve but swelled. Upon completion of the reaction the resulting mixture was treated with water and the polymer isolated. After collecting on a filter the polymer was washed several times with 5% sodium bicarbonate solution and then with water. The polymer was dried in vacuo at 50–60° for 24 hours. The yield of diester was 10.25 g. (96.7% of theory). It had a softening point (sticking point) of less than 20°. An intrinsic viscosity of 0.88 was obtained in cyclohexanone at 25°.

(G) A 250 ml. flask was charged with 5.0 g. of the chloroprene-maleic anhydride copolymer from Example X. Ethyl alcohol, 85 ml. and 0.5 g. p-toluenesulfonic acid were added and the mixture refluxed for 20 hours in a nitrogen atmosphere. Benzene was added to remove water from the reaction mixture by azeotropic distillation. Excess solvent was removed by distillation and the diester precipitated by addition of a 1–2% sodium bicarbonate solution. The polymer was collected and washed with water. Further purification was achieved by dissolving in acetone and reprecipitating with water. The polymer was dried in vacuo. The yield of diester was 3 g. (43.7% of theory). It had a softening point (sticking point) of 122–24°. An intrinsic viscosity of 0.43 was obtained in cyclohexanone at 25°.

(H) A 250 ml. flask was charged with 5.0 g. of the chloroprene-maleic anhydride copolymer from Example X. n-Butanol, 80 ml., and 0.5 g. p-toluenesulfonic acid were added and the mixture refluxed for 15 hours in a nitrogen atmosphere. Toluene was added to remove water from the reaction mixture by azeotropic distillation. Excess solvent was removed by distillation and the diester precipitated by addition of a 1–2% sodium bicarbonate solution. The polymer was collected and washed with water. Further purification was achieved by dissolving in acetone and precipitating with water. The polymer was dried in vacuo. The yield of diester was 6.5 g. (75.6% of theory). It had a softening point (sticking point) of less than 20°. An intrinsic viscosity of 0.55 was obtained in cyclohexanone at 25°.

(I) A 250 ml. flask was charged with 5.0 g. of the chloroprene-maleic anhydride copolymer from Example X. 2-butoxyethanol, 85 ml., and 0.5 g. p-toluenesulfonic acid were added and the mixture refluxed for 15 hours in a nitrogen atmosphere. Toluene was added to remove water from the reaction mixture by azeotropic distillation. Excess solvent was removed by distillation and the diester precipitated by addition of a 1–2% sodium bicarbonate solution. The polymer was collected and washed with water. Further purification was achieved by dissolving in acetone and reprecipitating with water. The polymer was dried in vacuo. The yield of diester was 8.25 g. (75.7% of theory). It has a softening point (sticking point) of less than 20°. An intrinsic viscosity of 0.58 was obtained in cyclohexanone at 25°.

EXAMPLE XVI

Diene-maleic acid copolymers (A) Four grams of an isoprene-maleic anhydride polymer from Example II was added to 100 ml. of distilled water in an Erlenmeyer flask and heated. After 20 minutes a cloudy solution resulted. The contents of the flask were allowed to cool and to insure complete precipitation of the isoprene-maleic acid copolymer sodium chloride solution was added until no more polymer precipitated. The polymer filtered and dried in vacuo at room temperature. The yield was 4.4 g. (90.5% of theory). The infrared spectrum of this material was consistent with that expected of an acid. The polymer started to swell and stick at 120°. It had a sticking point of 160°.

(B) Four grams of isoprene-maleic anhydride polymer from Example IX was added to 250 ml. of distilled water in an Erlenmeyer flask. The flask was heated for 1½ hours. The polymer did not wholly dissolve but its appearance changed. Polymer in solution was precipitated by adding sodium chloride solution. The polymer was filtered and dried overnight in vacuo. It was yellow in color. The yield of diacid was quantitative. A portion of the polymer was added to dimethylformamide and the yellow color disappeared from the polymer. It was filtered, washed with acetone and petroleum ether and was dried in vacuo. The polymer had a softening point (sticking temperature) of 76°.

(C) Two grams of the polymer from Example X were heated with 100 g. of distilled water in a 250 ml. Erlenmeyer flask for forty minutes with stirring. The reaction mixture was allowed to cool and potassium chloride solution was added to precipitate the polymer in solution. The polymer was collected by decanting the solution from the rubbery mass. It was dried in vacuo. The yield of diacid was quantitative. It had a softening point (sticking point) of 100°.

EXAMPLE XVII

Diene-maleic acid salts (A) The polymer prepared in Example II (5.0 g.) was charged to a flask equipped with thermometer, stirrer and condenser. Upon the addition of 5.26 g. of 29% aqueous ammonia solution (containing 0.15 moles of $NH_3$, essentially a 5 fold molar excess over the 0.03 mole of anhydride units in 5.0 g. of polymer) there was an immediate exotherm raising the temperature to 40°. On heating at 80° C. for a few minutes the reaction mixture became clear, and was maintained at 50° C. for an additional hour. The product was isolated by precipitation by pouring the aqueous solution into acetone. After an additional reprecipitation by dissolving in water and pouring into acetone, and drying in a vacuum oven there was obtained 5.4 g. of white powdery product (89% of yield based on ammonium salt-acid). On heating, the product began to decompose at about 100° C., losing ammonia and finally melting at 206° C.

The elemental analysis of the product indicated C, 54.6%; H, 7.8%; N, 8.4%. This indicates that the product is at least 75% half ammonium salt-acid and may contain approximately 15% of the half ammonium salt-amide and 10% of the acid-amide (calcd. on this basis: C, 54.9%; H, 7.6%; N, 8.3%). The polymer may also contain some imide groups. A product containing 75% half ammonium salt-acid, 20% of half ammonium salt-amide and 5% of the imide would have the following analysis: C, 54.4%; H, 7.6%; N, 8.5%.

The product was soluble in water and was insoluble in acetone, benzene and dimethylformamide.

The infrared spectrum of the material had strong absorption bands at 1660 cm.$^{-1}$ and at 1545 cm.$^{-1}$, assigned to a salt carbonyl and an ammonium cation, respectively. These bands disappeared on heating as the product became converted to the imide.

(B) When the procedure of Example A was repeated with 5.0 g. of the high molecular weight copolymer, the preparation of which is described in Example IX, it was found that four times as much 29% ammonium (21.0 g.; 0.602 mole $NH_3$) and 50 ml. of additional water was required to prepare a homogeneous solution (having extremely high viscosity). The product was isolated by trituration with acetone. It weighed 5.0 g. (83% yield calculated as ammonium salt-acid). On heating the product showed signs of decomposition at 180° C., and melted at 320° C.

The elemental analysis of the product indicated C, 55.2%; H, 8.0%; N, 9.7%. This indicates that the product is predominantly half ammonium salt-acid but more imide is present than in the case of the lower molecular weight anhydride copolymer.

(C) Polymer from Example X, 12.11 g. (0.067 mole) was weighed into a 250 ml. flask. Ammonium hydroxide, 8.6 ml., and water, 41.4 ml., was added and the mixture heated to 70°. After 30 minutes 4.3 ml. ammonium hydroxide and 50 ml. water were introduced into the reaction vessel. The mixture was heated at 70–95° for 5 hours and a nearly homogeneous solution was obtained. The product was precipitated by adding acetone containing aqueous sodium chloride solution. The polymer was dried in vacuo. It was purified by dissolving in water and reprecipitating using acetone-aqueous sodium chloride solution. The ammonium salt was filtered and washed with methanol and dried in vacuo at 40–50° for 6 hours. The yield of ammonium salt was 12.75 g. (88.6% of theory). No softening point (sticking point) was observed up to 260°. A 1.0% solution has a viscosity corresponding to Gardner viscosity tube A.

(D) Five grams of polymer from Example IX were refluxed with a solution of 2.5 g. sodium hydroxide and 50 ml. water in a 250 ml. flask for 2 hours, until a clear solution was obtained. The sodium salt was precipitated by addition of methanol, washed several times with methanol and dried in vacuo. It was then dissolved in 40–50 ml. water, reprecipitated by addition to excess acetone, washed several times with acetone and dried in vacuo at 45° for 7 hours. The yield of sodium salt was 1.2 g. (17.4% of theory). The softening point (sticking point) was over 260°. At a concentration of 0.2% the salt had an inherent viscosity of 10.186 in water, 9.254 in 0.01% potassium chloride and 8.945 in 0.005% potassium chloride at 25°.

(E) Five grams of polymer from Example X were refluxed with a solution of 2.2 g. sodium hydroxide and 25 ml. water in a 250 ml. flask for 2 hours, until a clear solution was obtained. The sodium salt was precipitated by addition of methanol, washed several times with methanol and dried in vacuo. It was then dissolved in 40–50 ml. water and reprecipitated by addition to excess acetone, washed several times with acetone and dried in vacuo at 45° for 15 hours. The yield of sodium salt was 3.1 g. (42.7% of theory). The softening point (sticking point) was over 260°. At a concentration of 0.2% the salt had an inherent viscosity of 8.811 in water and 4.782 in 0.1% potassium chloride at 25°.

EXAMPLE XVIII

Diene-maleic acid amides (A) The copolymer obtained in Example II, 4 g., was dissolved in 100 ml. of tetrahydrofuran. An excess of gaseous ammonia was bubbled into the solution, resulting in an exothermic reaction and the precipitation of a white solid. This was collected on a funnel, then dissolved in water and neutralized by the addition of dilute hydrochloric acid, whereupon the amide acid precipitated. It was collected on a funnel and dried in vacuo. The yield of amide acid was quantitative. The polymer had a softening point range of 174–178° C. and was soluble in water, dimethylsulfoxide and dimethylformamide.

(B) The polymer obtained in Example IX, 4 g., was suspended in 100 cc. benzene and an excess of gaseous ammonia was bubbled into the solution. An exothermic reaction took place. Ammonia addition was continued until the contents of the flask reached room temperature. The polymer during ammonia addition was broken up with a spatula to aid reaction. The flask was stoppered and allowed to sit 3 days. The suspension was filtered and then dissolved in water. A completely homogeneous solution did not result. Dilute hydrochloric acid was added and the amide-acid collected and dried in vacuo. The yield of amide-acid was quantitative. It had a softening point of 162–170° C. On compression molding at 360° F. the amide acid forms a rigid film.

(C) Polymer from Example X, 2 g., was dissolved in 75 cc. tetrahydrofuran. Gaseous anhydrous, ammonia was bubbled into the solution. A slightly exothermic reaction took place and a precipitate formed immediately. The mixture was stirred until the flask cooled. The precipitate was filtered, dissolved in distilled water and acidified. The polymer reaction mixture was allowed to sit overnight to allow the polymer to settle. The next day it was filtered, washed with water and dried in vacuo. Yield 2.02 g., theoretical yield 2.18 g.=92.7%. The polymer had a softening point (sticking point) of 158–160°.

(D) Four grams of the polymeric anhydride of Example II dissolved in 30 ml. of acetone was added to a solution of 20 g. of n-butylamine in 100 ml. of acetone. An exothermic reaction ensued and a white product precipitated. It was collected on a funnel and dried. The polymer was soluble in dimethylformamide, butanol and o-dichlorobenzene and had a softening point of 156–160° C. The infrared spectrum was very similar to that of the analogous octadecylamide-acid and was consistent with the structure N-n-butyl amide-acid. The yield of the amide-acid was quantitative. The reduced viscosity of the polymer in butanol at 25° C. was 0.14 dl./g. at a concentration of 0.12 g./dl.

*Analysis.*—Calcd. for $(C_{13}H_{21}O_3N)_x$: Calcd., percent N, 5.85, Found 5.55.

(E) In this case 4.0 g. of the copolymer of Example IX was dissolved in 100 ml. of dimethylformamide giving a very viscous solution. This was added with stirring and heating to a solution of 20.0 g. of n-butylamine in 30 ml. of dimethylformamide. With additional stirring and heating a homogeneous solution was obtained. The amide-acid was precipitated by slowly adding the dimethylformamide solution to dioxane. It was collected on a funnel washed with dioxane and dried in a vacuum oven. This high molecular weight N-n-butylamide acid which was obtained in quantitative yield, softened at 149–151° C. The reduced viscosity of the polymer in butanol at 25° C. was 0.495 dl./g. at a concentration of 0.12 g./dl.

*Analysis.*—Calcd. for $(C_{13}H_{21}O_3N)_x$: Calcd., percent N, 5.85; Found, 5.77%.

(F) Polymer from Example X, 2 g., was dissolved in 15 cc. acetone. It was added to butylamine in 50 cc. acetone. A precipitate and an emulsion formed. Methanol was added to the solution and the polymer dissolved. It was precipitated by adding methanolic calcium chloride. After filtration the polymer was washed with water, then with acetone and it was finally dried in vacuo. The polymer was dissolved in sodium carbonate. A cloudy solution was obtained. The solution was acidified with hydrochloric acid, the polymer filtered and dried in vacuo. It weighed 2.46 g.; theoretical yield 2.78 g., 88.5% of theory. The polymer was soluble in dimethylformamide, dimethyl sulfoxide. It was slightly soluble in butanol, cyclohexanone and tetrahydrofuran. It had a sticking point range of 148–152° C.

(G) A solution of 4.0 g. (0.024 equivalent) of copolymer of Example II in 20 ml. of acetone was added to a solution of 20.0 g. (0.7 mole) of octadecylamine. A heavy white precipitate came down immediately and was collected on a funnel. A second crop of product was obtained by adding the acetone filtrate to a methanolic calcium chloride solution. The combined products were then dissolved in cyclohexanone and precipitated by addition of the solution to acetone. A quantitative yield was obtained. This amide acid melted at 124° C. The reduced viscosity of the copolymer in cyclohexanone at 25° C. was 0.351 dl./g. at a concentration of 0.28 g./dl.

The infrared spectrum of the material confirmed the presence of amide and acid absorption bands in the polymer.

*Analysis.*—Calcd. for $(C_{27}H_{49}NO_3)$: C, 74.43%; H, 11.34%. Found: C, 74.23; H, 11.23.

Compression molding at 270° F. yielded a clear, rigid film.

(H) The copolymer prepared in Example IX, 4 g., was swollen in about 50 ml. of acetone and added to a solution of 20 g. of octadecylamine in 125 ml. of acetone. Solid material precipitated, and after agitating and distributing the polymer throughout the amine solution, the reaction mixture was allowed to stand for several hours. It was collected on a funnel, dissolved in cyclohexanone and reprecipitated by slowly adding to acetone. This high molecular weight amide acid was obtained in quantitative yield. It had a softening point of 124° C. The reduced viscosity of the copolymer in cyclohexanone at 25° C. was 0.445 dl./g. at a concentration of 0.208 g./dl. The infrared spectrum of this material was identical to that of the lower molecular weight analogue.

*Analysis.*—Calcd. for $(C_{27}H_{49}NO_3)$: N, 3.22. Found: N, 3.35.

(I) Polymer from Example X, 2 g., was dissolved in 15 cc. acetone. It was allowed to react with octadecylamine, 6 g. (3×excess) dissolved in 100 cc. acetone. A precipitate and an emulsion formed. Methanol was added and the polymer coagulated. It was allowed to sit overnight and was filtered the next day. The polymer was placed in a Soxhlet extractor and extracted with acetone for 3 hours. The polymer was dried in vacuo. The yield of polymer was quantitative. The polymer had a softening point range of 106–110° C. It was soluble in tetrahydrofuran and cyclohexanone. At a concentration of 0.10 g./dl. the polymer has a reduced viscosity of 2.37 dl./g. in cyclohexanone at 25° C.

(J) Four grams of copolymer obtained in Example II was dissolved in 25 cc. tetrahydrofuran. It was added to distilled di-n-butylamine, 16 g., dissolved in 100 cc. acetone. A dark orange semi-solid precipitated which was methanol soluble. The product was precipitated using acetone and petroleum ether. The precipitate was filtered and dried in vacuo. The yield of polymer was 6.89 g. (96.8% of theory). It had a softening point (sticking point) of 116–118°. A reduced viscosity of 0.425 dl./g. was obtained in dimethyl sulfoxide at concentration of 0.106 g./dl. at 25°.

(K) Four grams of copolymer from Example IX was suspended in 50 cc. tetrahydrofuran in which it swelled. This mixture was added to 10 cc. (5×excess) of di-n-butylamine dissolved in 75 cc. acetone with stirring. The amide-acid formed as evidenced by a change of appearance of the polymer. The mixture was allowed to sit overnight. The next day the solution was decanted from the polymer and acetone added. Petroleum ether was then added. The polymer was dried in vacuo and then extracted with acetone in a Soxhlet extractor and dried again. The yield of polymer was quantitative. It had a softening point (sticking point) of 110–12°. It was soluble in dimethyl sulfoxide, dimethylformamide and slightly soluble in tetrahydrofuran and cyclohexanone.

(L) Two grams of copolymer from Example X were dissolved in 50 ml. tetrahydrofuran and added to 8 g. (4×excess) of di-n-butylamine in 50 ml. acetone. A gummy precipitate and emulsion formed. The reaction mixture sat overnight. The next day petroleum ether was added to aid coagulation. Liquid was decanted from the polymer which was washed with acetone and petroleum ether. The polymer was extracted with acetone in a Soxhlet and dried in vacuo. The yield of polymer was quantitative. It had a softening point (sticking point) of 134–36°.

EXAMPLE XIX

Diene-maleimide copolymers (A) A 50 ml. one-necked round bottom flask was charged with 1.3925 g. of the product of Example XVII–A. The flask was then affixed in a flask evaporator and rotated while immersed in an oil bath at 142° C. under vacuum. Heating was continued for 2 hours, during which time the product underwent a 13.6% weight loss (theoretical weight loss=22.8%). During heating the material seemed to be composed of a solid phase and a slightly molten phase. The isolated product had a sticking temperature of 204° C. The infrared spectrum of the resulting polymer compared favorably with that of an authentic isoprene-maleimide copolymer.

(B) When the procedure described above was repeated except that 1.4926 g. of the product of Example XVII–B was used as starting material, a 13.8% weight loss was observed, and the product softened above 260° C.

The infrared spectra of materials from Examples A and B were identical. They showed absorption bands at 1770 cm.$^{-1}$ and at 1700 cm.$^{-1}$. These correspond to carbonyl of

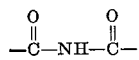

(cyclic). The absorption at 1645 cm.$^{-1}$ is assigned to the NH group also in a cyclic structure. All three are bands not present in the starting material; the 1660 cm.$^{-1}$ and 1545 cm.$^{-1}$ bands of the starting material were no longer present in the product.

The novel copolymers or derivatives thereof of the present invention may be employed as thickeners, stabilizers, dispersants, binders, emulsifiers, textile and paper sizing agents, leveling agents in floor polishes or latexes, etc.

The polyanhydrides or half esters or amides may be utilized to cure alkyd, epoxy, amine-formaldehyde, thermosetting acrylic and other resins containing reactive functional groups or may themselves be cured by such agents.

The salts may also be used as nucleating agents for crystallization in thermoplastic resins such as polyolefins and polyamides as well as nucleating agents in expandable thermoplastic resins.

While particular embodiments of this invention are shown above, it will be understood that the invention is obviously subject to variations and modifications without departing from its broader aspects.

What is claimed is:

1. A 1:1 alternating copolymer of maleic anhydride and a conjugated diene having the formula:

$$RCH=\underset{\underset{R_1}{|}}{C}-\underset{\underset{R_2}{|}}{C}=CHR_3$$

wherein R, $R_1$, $R_2$ and $R_3$ are members selected from the group consisting of hydrogen, halogen, aryl radical and alkyl, cycloalkyl and alkoxyl radicals having from 1 to 8 carbon atoms, and wherein R, $R_1$, $R_2$, and $R_3$ are the same or different; said copolymer being insoluble in aromatic hydrocarbons and containing at least 75% cis-1,4-unsaturation.

2. A copolymer of maleic anhydride and a conjugated diene having at least 75% recurring units of the formula

[structural formula]

wherein R, $R_1$, $R_2$ and $R_3$ are members selected from the group consisting of hydrogen, halogen, aryl radical and alkyl, cycloalkyl and alkoxyl radicals having from 1 to 8 carbon atoms, and wherein R, $R_1$, $R_2$ and $R_3$ are the same or different; and wherein the carbon-to-carbon double bond structure is cis-1,4.

3. The copolymer of claim 2 wherein said conjugated diene is butadiene.

4. The copolymer of claim 2 wherein said conjugated diene is isoprene.

5. The copolymer of claim 2 wherein said conjugated diene is 2,3-dimethylbutadiene.

6. The copolymer of claim 2 wherein said conjugated diene is 2-chloro-1,3-butadiene.

7. The copolymer of claim 2 wherein said conjugated diene is 2,3-dichlorobutadiene.

8. The copolymer of claim 2 wherein said conjugated diene is piperylene.

9. The copolymer of claim 2 wherein said conjugated diene is 2,4-hexadiene.

10. The copolymer of claim 2 which is soluble in polar solvents and insoluble in halogenated and aromatic hydrocarbons.

11. A process for the preparation of predominantly cis-1,4 1:1 alternating copolymers of maleic anhydride and conjugated dienes, said conjugated dienes having the formula:

$$RCH=\underset{\underset{R_1}{|}}{C}-\underset{\underset{R_2}{|}}{C}=CHR_3$$

wherein R, $R_1$, $R_2$ and $R_3$ are members selected from the group consisting of hydrogen, halogen and aryl, alkyl, cycloalkyl and alkoxyl radicals having from 1 to 8 carbons and wherein R, $R_1$, $R_2$ and $R_3$ are the same or different, which comprises reacting said maleic anhydride with said conjugated diene in the presence of a free radical generator at a temperature at which the free radical generator has a half life of 60 minutes or less.

12. The process of claim 11 wherein said conjugated diene is selected from the group consisting of butadiene, isoprene, 2,3-dimethylbutadiene, 2-chloro-1,3-butadiene, 2-3-dichlorobutadiene, piperylene, 1-methoxybutadiene, 2-methoxybutadiene and 2,4-hexadiene.

13. The process of claim 11 wherein said free radical generator is an organic peroxide or azo compound.

14. The process of claim 11 wherein said organic peroxide is selected from the group consisting of tert-butyl peroxypivalate, benzoyl peroxide and lauroyl peroxide.

15. The process of claim 11 wherein said organic peroxide is produced by exposing an organic compound containing an abstractable hydrogen atom and characterized by having at least one —O—CHR group, to air or oxygen.

16. The process of claim 15 wherein said organic compound containing an abstractable hydrogen atom is selected from the group consisting of dioxane, tetrahydrofuran or a dialkyl or alkyl aryl ether.

17. The process of claim 11 wherein said free radicals are produced by irradiating the reaction mixture in air.

18. The process of claim 11 wherein said free radical generator is mixed with the conjugated diene and added to the maleic anhydride.

19. A copolymer of a conjugated diene and a maleic acid derivative having the structural formula

[structural formula]

wherein R, $R_1$, $R_2$ and $R_3$ are members selected from the group consisting of hydrogen, halogen, aryl radicals and alkyl, cycloalkyl and alkoxyl radicals having from 1 to 8 carbon atoms, and wherein R, $R_1$, $R_2$ and $R_3$ are the same or different; and wherein at least 75% if the carbon-to-carbon double bond structure is cis-1,4; and wherein X and Y are members selected from the group consisting of OZ and $NR_4R_5$; and wherein Z is an alkali or alkaline earth metal or the ammonium radical or a member selected from the group consisting of hydrogen, aryl radical and alkyl and cycloalkyl radicals having from 1 to 26 carbon atoms; and wherein $R_4$ and $R_5$ are members selected from the group consisting of hydrogen, aryl radical and alkyl and cycloalkyl radicals having from 1 to 26 carbon atoms; and wherein $R_4$ and $R_5$ are the same or different; and wherein X and Y are the same or different.

20. A process for the preparation of the copolymers of claim 19, which comprises reacting the copolymers of of claim 2 with either (a) monohydric alcohols having from 1 to 26 carbon atoms and are saturated or unsaturated, (b) water, (c) ammonium hydroxide or an alkali or alkaline earth metal oxide or hydroxide, or (d) primary, secondary or tertiary amines.

References Cited

UNITED STATES PATENTS 2,967,174   1/1961   Bartl.

FOREIGN PATENTS 592,794   2/1960   Canada.
818,715   8/1958   Great Britain.

JOSEPH L. SCHOFER, Primary Examiner

JOHN KIGHT, Assistant Examiner